(12) United States Patent
Offord et al.

(10) Patent No.: US 8,551,419 B2
(45) Date of Patent: Oct. 8, 2013

(54) CONTAINER HAVING AN OXYGEN SCAVENGING INDICATION SYSTEM

(75) Inventors: David Offord, Hayward, CA (US); John G. Brace, Saline, MI (US)

(73) Assignee: Amcor Limited, Hawthorn (AU)

( * ) Notice: Subject to any disclaimer, the term of this patent is extended or adjusted under 35 U.S.C. 154(b) by 225 days.

(21) Appl. No.: 13/042,970

(22) Filed: Mar. 8, 2011

(65) Prior Publication Data
US 2011/0223068 A1 Sep. 15, 2011

Related U.S. Application Data

(60) Provisional application No. 61/313,159, filed on Mar. 12, 2010.

(51) Int. Cl.
*G01N 21/75* (2006.01)

(52) U.S. Cl.
USPC ......................................................... 422/405

(58) Field of Classification Search
USPC .......................................................... 422/405
See application file for complete search history.

(56) References Cited

U.S. PATENT DOCUMENTS

| | | | |
|---|---|---|---|
| 3,419,400 A | 12/1968 | Hayhurst et al. | |
| 3,811,999 A | 5/1974 | Fleischer et al. | |
| 4,013,422 A | 3/1977 | Spinner et al. | |
| 4,279,350 A | 7/1981 | King | |
| 4,516,679 A * | 5/1985 | Simpson et al. | 206/459.1 |
| 5,045,283 A * | 9/1991 | Patel | 422/424 |
| 5,316,949 A * | 5/1994 | Bull et al. | 436/5 |
| 5,358,876 A * | 10/1994 | Inoue et al. | 436/136 |
| 5,735,984 A | 4/1998 | Hoff et al. | |
| 5,804,236 A | 9/1998 | Frisk | |
| 6,254,969 B1 * | 7/2001 | Eberle | 428/195.1 |
| 6,454,965 B1 | 9/2002 | Ching et al. | |
| 7,368,153 B2 * | 5/2008 | Barmore et al. | 428/36.7 |
| 2003/0082321 A1 * | 5/2003 | Kennedy et al. | 428/35.7 |
| 2004/0050740 A1 * | 3/2004 | Lewis | 206/459.1 |
| 2004/0071885 A1 | 4/2004 | Hutchinson et al. | |
| 2005/0087452 A1 | 4/2005 | McAnalley et al. | |
| 2009/0028756 A1 * | 1/2009 | Shahriari | 422/83 |
| 2009/0074611 A1 | 3/2009 | Monzyk et al. | |
| 2009/0220717 A1 | 9/2009 | Wilczak et al. | |
| 2010/0028499 A1 | 2/2010 | Rule et al. | |
| 2012/0114529 A1 | 5/2012 | Carmichael et al. | |

FOREIGN PATENT DOCUMENTS

| | | |
|---|---|---|
| EP | 0758611 | 2/1997 |
| WO | WO 00/54866 | 9/2000 |
| WO | WO 2006/112958 | 10/2006 |
| WO | WO 2008/090354 | 7/2008 |
| WO | WO 2010/115992 | 10/2010 |
| WO | WO 2010/116192 | 10/2010 |

OTHER PUBLICATIONS

International Search Report and Written Opinion mailed Dec. 27, 2011 in corresponding International Patent Application No. PCT/US2011/027707 (eight pages).

\* cited by examiner

*Primary Examiner* — Lore Jarrett
(74) *Attorney, Agent, or Firm* — Harness, Dickey & Pierce, P.L.C.

(57) ABSTRACT

A polyethylene terephthalate container having a hydrogen generator and catalyst disposed or otherwise incorporated in components of the container. The container further comprises an indicator system or means for use with a hydrogen generator and a catalyst system.

16 Claims, 1 Drawing Sheet

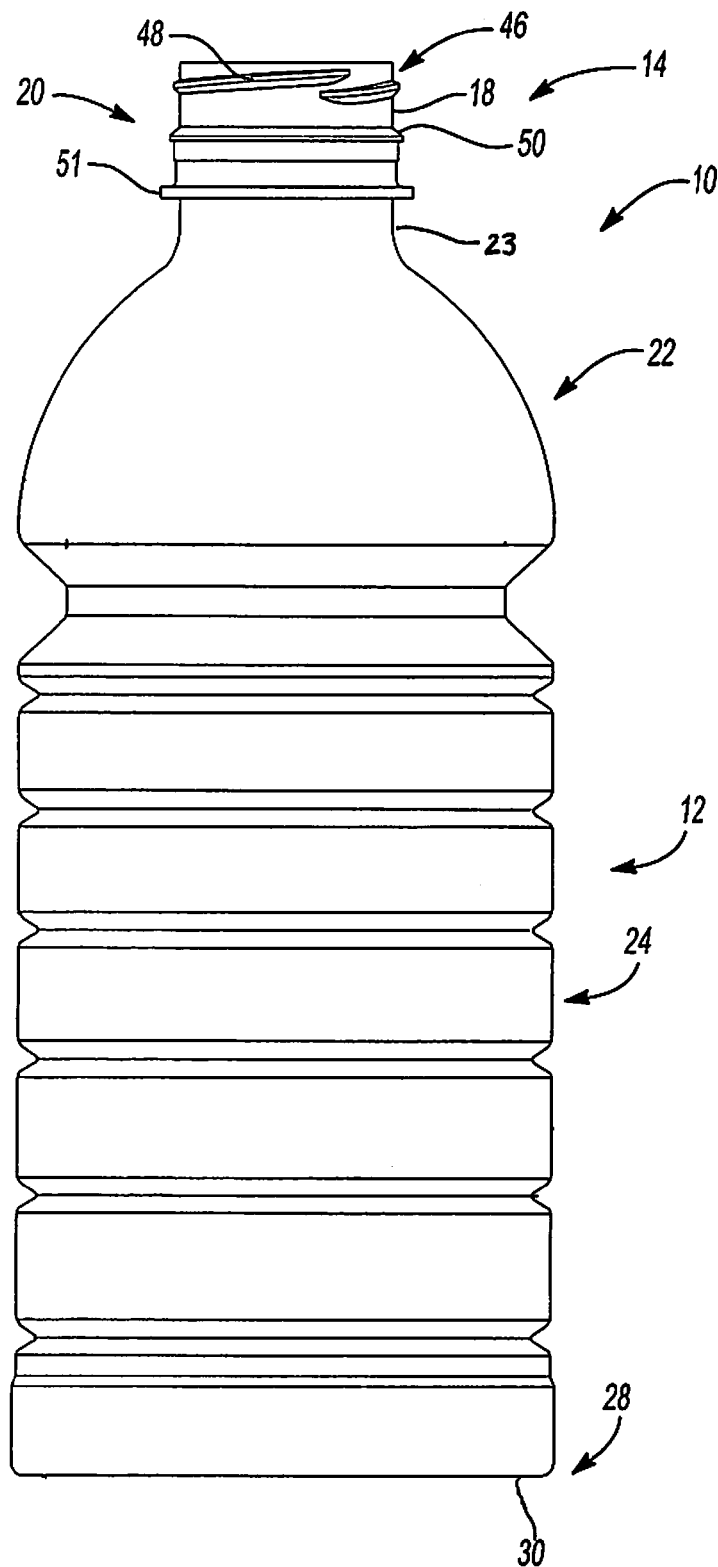

CONTAINER HAVING AN OXYGEN SCAVENGING INDICATION SYSTEM

CROSS-REFERENCE TO RELATED APPLICATIONS

This application claims the benefit of U.S. Provisional Application No. 61/313,159, filed on Mar. 12, 2010. The entire disclosure of the above application is incorporated herein by reference.

FIELD

This disclosure generally relates to containers for retaining a commodity, such as a solid or liquid commodity. More specifically, this disclosure relates to a polyethylene terephthalate (PET) container having an indicator system for use with an oxygen scavenging system having a hydrogen generator and a catalyst.

BACKGROUND

This section provides background information related to the present disclosure which is not necessarily prior art.

As a result of environmental and other concerns, plastic containers, more specifically polyester and even more specifically polyethylene terephthalate (PET) containers are now being used more than ever to package numerous commodities previously supplied in glass containers. Manufacturers and fillers, as well as consumers, have recognized that PET containers are lightweight, inexpensive, recyclable and manufacturable in large quantities.

Blow-molded plastic containers have become commonplace in packaging numerous commodities. PET is a crystallizable polymer, meaning that it is available in an amorphous form or a semi-crystalline form. The ability of a PET container to maintain its material integrity relates to the percentage of the PET container in crystalline form, also known as the "crystallinity" of the PET container. The following equation defines the percentage of crystallinity as a volume fraction:

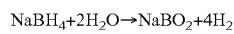

$$\% \text{ Crystallinity} = \left(\frac{\rho - \rho_a}{\rho_c - \rho_a}\right) \times 100$$

where $\rho$ is the density of the PET material; $\rho_a$ is the density of pure amorphous PET material (1.333 g/cc); and $\rho_c$ is the density of pure crystalline material (1.455 g/cc).

Unfortunately, PET is a poor barrier to oxygen. One of the main factors that limit the shelf life of foods and beverages (herein known as "fills") in PET containers is the ingress of oxygen through the walls of the container followed by oxidation of the fill. Many strategies have been employed to reduce the amount of oxygen in contact with food in PET containers. Some strategies include headspace replacement, which replaces oxygen in the headspace during packaging with an inert gas, such as $N_2$ or $CO_2$. Alternative strategies include using package barrier coatings, such as chemical vapor deposited (CVD) aluminum oxide or silicon oxide. Still further, some strategies include the use of embedded barrier layers, such as multilayer packages, or PET barrier additives that create physical barriers to oxygen diffusion through the packaging (e.g., nylon, nanoclays). Finally, some strategies have used oxygen scavengers that react with oxygen in a predetermined way (e.g., oxidizable plastics, hydrogen gas, reactive metals and organic molecules) to minimize its effect, which usually requires the use of a catalyst.

An example of oxygen reducing technology is available from ColorMatrix (herein known as "Hy-Guard Technology"; International Publication Number WO 2008/090354 A1, which is hereby incorporated by reference). The technology involves the slow release of hydrogen from the container using a hydrogen generator such as sodium borohydride that releases hydrogen on exposure to water according to the following reaction:

$$NaBH_4 + 2H_2O \rightarrow NaBO_2 + 4H_2$$

The hydrogen subsequently reacts with oxygen in the presence of a metal catalyst (e.g., palladium) to create water. The hydrogen that does not react with oxygen will slowly permeate out of the container.

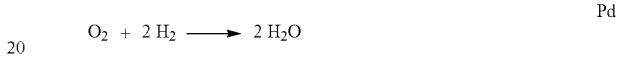

However, the ColorMatrix system fails to teach or suggest a method to determine when the hydrogen generator is spent and/or non-functioning. This can negatively effect the functioning of the system and limit its usefulness and application, because it can permit ingress of oxygen into the container and again begin to degrade the fill.

Container manufacturers use mechanical processing and thermal processing to increase the PET polymer crystallinity of a container. Mechanical processing involves orienting the amorphous material to achieve strain hardening. This processing commonly involves stretching an injection molded PET preform along a longitudinal axis and expanding the PET preform along a transverse or radial axis to form a PET container. The combination promotes what manufacturers define as biaxial orientation of the molecular structure in the container. Manufacturers of PET containers currently use mechanical processing to produce PET containers having approximately 20% crystallinity in the container's sidewall.

Thermal processing involves heating the material (either amorphous or semi-crystalline) to promote crystal growth. On amorphous material, thermal processing of PET material results in a spherulitic morphology that interferes with the transmission of light. In other words, the resulting crystalline material is opaque, and thus, generally undesirable. Used after mechanical processing, however, thermal processing results in higher crystallinity and excellent clarity for those portions of the container having biaxial molecular orientation. The thermal processing of an oriented PET container, which is known as heat setting, typically includes blow molding a PET preform against a mold heated to a temperature of approximately 250° F.-350° F. (approximately 121° C.-177° C.), and holding the blown container against the heated mold for approximately two (2) to five (5) seconds. Manufacturers of PET juice bottles, which must be hot-filled at approximately 185° F. (85° C.), currently use heat setting to produce PET bottles having an overall crystallinity in the range of approximately 25%-35%.

SUMMARY

This section provides a general summary of the disclosure, and is not a comprehensive disclosure of its full scope or all of its features.

According to the principles of the present teachings, a PET container is provided having a hydrogen generator and catalyst disposed or otherwise incorporated in components of the container. The container further comprises an indicator system or means for indicating when the hydrogen generator has been spent or is otherwise not functioning.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIG. 1 is a side view of an exemplary container incorporating the features of the present teachings.

Corresponding reference numerals indicate corresponding parts throughout the several views of the drawings.

DETAILED DESCRIPTION

Example embodiments will now be described more fully with reference to the accompanying drawing. Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure.

The terminology used herein is for the purpose of describing particular example embodiments only and is not intended to be limiting. As used herein, the singular forms "a", "an" and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on", "engaged to", "connected to" or "coupled to" another element or layer, it may be directly on, engaged, connected or coupled to the other element or layer, or intervening elements or layers may be present. In contrast, when an element is referred to as being "directly on," "directly engaged to", "directly connected to" or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath", "below", "lower", "above", "upper" and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

This disclosure provides for a container being made of PET and incorporating a hydrogen generator and catalyst component. The container of the present teachings controls and/or reduces the effect of oxygen penetrating the container material and entering the commodity or fill contained therein. The container of the present teachings further comprises an indicator system for determining when the hydrogen generator is spent or non-functioning to, at least in part, ascertain the shelf life of the product.

It should be appreciated that the size and specific configuration of the container may not be particularly limiting and, thus, the principles of the present teachings can be applicable to a wide variety of PET container shapes. Therefore, it should be recognized that variations can exist in the present embodiments. That is, it should be appreciated that the teachings of the present disclosure can be used in a wide variety of containers, including reusable/disposable packages including resealable plastic bags (e.g., ZipLock®bags), resealable containers (e.g., TupperWare® containers), dried food containers (e.g., dried milk), drug containers, and oxygen-sensitive chemical packaging.

Accordingly, the present teachings provide a plastic, e.g. polyethylene terephthalate (PET), container generally indicated at 10. The exemplary container 10 can be substantially elongated when viewed from a side. Those of ordinary skill in the art would appreciate that the following teachings of the present disclosure are applicable to other containers, such as rectangular, triangular, pentagonal, hexagonal, octagonal, polygonal, or square shaped containers, which may have different dimensions and volume capacities. It is also contemplated that other modifications can be made depending on the specific application and environmental requirements.

As shown in FIG. 1, the exemplary plastic container 10 according to the present teachings defines a body 12, and includes an upper portion 14 having a cylindrical sidewall 18 forming a finish 20. Integrally formed with the finish 20 and extending downward therefrom is a shoulder portion 22. The shoulder portion 22 merges into and provides a transition between the finish 20 and a sidewall portion 24. The sidewall portion 24 extends downward from the shoulder portion 22 to a base portion 28 having a base 30. In some embodiments, sidewall portion 24 can extend down and nearly abut base 30, thereby minimizing the overall area of base portion 28 such that there is not a discernable base portion 28 when exemplary container 10 is uprightly-placed on a surface.

The exemplary container 10 may also have a neck 23. The neck 23 may have an extremely short height, that is, becoming a short extension from the finish 20, or an elongated height, extending between the finish 20 and the shoulder portion 22. The upper portion 14 can define an opening for filling and dispensing of a commodity stored therein. Although the container is shown as a drinking container, it should be appreciated that containers having different shapes, such as sidewalls and openings, can be made according to the principles of the present teachings.

The finish 20 of the exemplary plastic container 10 may include a threaded region 46 having threads 48, a lower sealing ridge 50, and a support ring 51. The threaded region provides a means for attachment of a similarly threaded closure or cap (not illustrated). Alternatives may include other suitable devices that engage the finish 20 of the exemplary plastic container 10, such as a press-fit, BapCo-type, or snap-fit cap for example. Accordingly, the closure or cap (not illustrated) engages the finish 20 to preferably provide a hermetical seal of the exemplary plastic container 10. The closure or cap (not illustrated) is preferably of a plastic or metal material conventional to the closure industry and suitable for subsequent thermal processing.

As described herein, although the prior art provides a good method for scavenging oxygen from a closed container, it fails to provide any monitoring and/or indicia indicating termination or activation of the oxygen scavenging process. That is, it fails to provide any mechanism for determining when the hydrogen generator is spent or no longer functioning at a desired level. However, the principles of the present teachings provide a method for indicating when the hydrogen generator is spent and oxygen is entering the container. Having an indicator that activates when the hydrogen is no longer generated at a sufficient level to achieve the desired scavenging effect would be useful for both the package distributor and the consumer. In fact, the package distributor may store a package for a long period of time before delivery for sale to the consumer. Therefore, the indicator of the present teachings would be advantageous for decisions on when or if to ship the container.

Similarly, the consumer would benefit from such an indicator to determine when the contents of a package are no longer fresh. Since the consumer generally opens and closes a container many times during its use, oxygen is entering at a rate dependent on the number of times and how long the container is opened. Therefore, containers such as condiments which are not used often will retain their freshness longer than say a bottle of orange juice. A "shelf-life" indicator would allow the consumer to obtain the most use out of a given product instead of throwing away the product after a date printed on the package has passed.

To this end, the principles of the present teachings, in general, employ a material that change or otherwise outputs or provides an indicia when the material is in the presence of oxygen or the absence of hydrogen. By way of non-limiting examples, the following mechanisms have been found useful for recognizing when a container with oxygen scavenging capability has lost its ability to scavenge oxygen. These indicators can be placed in any part of the container that is visible to a person viewing the container.

A first group of indicators that has been found to provide the necessary indicia and reliability comprises oxygen sensitive dyes (redox-active dyes) that indicate when oxygen is present. In this way, redox-active dyes can be placed wherever they are easily visible to the end user including the container base, container wall, container label, printing ink or material used on the container, accessories (such as a badge, holder, band, handle or any other object that can be placed in contact with the container), and closure shell.

In some embodiments, the redox-active dyes can provide the necessary indicia through color change and/or invisible-to-visible (or vice versa) change. For example, in some embodiments, printing placed on an outer side of the container can change color. Similarly, in some embodiments, dyes dispersed in the container, closure, and/or label can change color. Likewise, in some embodiments, previously invisible printing can become visible, previously visible printing can become invisible, and/or dye dispersed in container, closure, or label can become visible or invisible.

In some embodiments, luminescence or fluorescence changes can provide the necessary indicia. That is, a compound that was previously not visible by luminescence or fluorescence (for example, under a UV light) can become visible. Likewise, a compound that was previously visible by luminescence or fluorescence (for example, under a UV light) can become invisible.

In some embodiments, an inhibitor depletion system can be used that is in the form of a chemical system that, in the presence of oxygen, permits a chemical reaction to take place. When an inhibitor to a reaction system is consumed by $O_2$, the reaction is allowed to proceed that causes some indication (for example, a polymerization).

In some embodiments, an oxygen sensitive label adhesive can be used that deteriorates in the presence of oxygen (or absence of hydrogen) causing a label to fall off revealing printing that says "contents expired" or similar. By way of non-limiting example, an adhesive can be permitted to oxidized by $O_2$, thus cross-linking, becoming rigid, and/or less sticky.

A second group of indicators that has been found to provide the necessary indicia and reliability comprises inhibitor depletion markers that indicate when hydrogen is not present. In this way, hydrogen sensitive dyes can be used that are one color in the presence of hydrogen and a different color in the absence of hydrogen and, in some embodiments, can be used irrespective of the presence of oxygen.

The foregoing description of the embodiments has been provided for purposes of illustration and description. It is not intended to be exhaustive or to limit the invention. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the invention, and all such modifications are intended to be included within the scope of the invention.

What is claimed is:

1. A container comprising:
    a hydrogen generator generating molecular hydrogen;
    a catalyst catalyzing a chemical reaction between said hydrogen and oxygen, said hydrogen generator and said catalyst combining to provide an oxygen scavenging capacity; and
    an indication system indicating when said oxygen scavenging capacity has been reduced;
    wherein said indication system comprises an oxygen sensitive label adhesive bonding a label to the container, said oxygen sensitive label adhesive becoming less adhered to said container in the presence of oxygen.

2. The container according to claim 1 wherein said indication system comprises:

a redox-active dye disposed within or placed on said container, said redox-active dye outputting a detectable signal when said oxygen scavenging capacity has been reduced.

3. The container according to claim 2 wherein said redox-active dye is disposed within or placed on a base portion, a shoulder portion, a sidewall portion, a label affixed to said sidewall portion, ink used in printing on the container, accessories connected to the container, a closure of the container, or any combination thereof.

4. The container according to claim 2 wherein said detectable signal is a color change.

5. The container according to claim 2 wherein said detectable signal is an invisible indicia to a visible indicia change.

6. The container according to claim 2 wherein said detectable signal is a luminescence change.

7. The container according to claim 2 wherein said detectable signal is a flourescence change.

8. The container according to claim 1 wherein said indication system comprises:
a hydrogen sensitive dye disposed within or placed on said container, said hydrogen sensitive dye outputting a detectable signal in response to a presence or absence of said molecular hydrogen.

9. A container comprising:
a hydrogen generator generating molecular hydrogen;
a catalyst catalyzing a chemical reaction between said hydrogen and oxygen, said hydrogen generator and said catalyst combining to provide an oxygen scavenging capacity; and
an indication means for indicating when said oxygen scavenging capacity has been reduced;
wherein said indication means comprises an oxygen sensitive label adhesive bonding a label to the container, said oxygen sensitive label adhesive becoming less adhered to said container in the presence of oxygen.

10. The container according to claim 9 wherein said indication means comprises:
a redox-active dye disposed within or placed on said container, said redox-active dye outputting a detectable signal when said oxygen scavenging capacity has been reduced.

11. The container according to claim 10 wherein said detectable signal is a color change.

12. The container according to claim 10 wherein said detectable signal is an invisible indicia to a visible indicia change.

13. The container according to claim 10 wherein said detectable signal is a luminescence change.

14. The container according to claim 10 wherein said detectable signal is a flourescence change.

15. The container according to claim 10 wherein said indication means is disposed in or placed on a base portion, a shoulder portion, a sidewall portion, a label affixed to said sidewall portion, ink used in printing on the container, accessories connected to the container, or a closure of the container.

16. The container according to claim 9 wherein said indication means comprises:
a hydrogen sensitive dye disposed in or placed on said container, said hydrogen sensitive dye outputting a detectable signal in response to a presence or absence of said molecular hydrogen.

* * * * *